United States Patent
Cho et al.

(10) Patent No.: US 8,004,948 B2
(45) Date of Patent: Aug. 23, 2011

(54) DATA RECORDING / REPRODUCING APPARATUS AND METHOD USING NEEDLE-SHAPED MEMBER

(75) Inventors: Yasuo Cho, Miyagi (JP); Atsushi Onoe, Saitama (JP)

(73) Assignees: Yasuo Cho, Miyagi (JP); Pioneer Corporation, Tokyo (JP)

(*) Notice: Subject to any disclaimer, the term of this patent is extended or adjusted under 35 U.S.C. 154(b) by 708 days.

(21) Appl. No.: 12/078,756

(22) Filed: Apr. 4, 2008

(65) Prior Publication Data

US 2010/0284263 A1    Nov. 11, 2010

Related U.S. Application Data

(62) Division of application No. 10/866,197, filed on Jun. 14, 2004, now Pat. No. 7,385,901.

(30) Foreign Application Priority Data

Jun. 12, 2003 (JP) ................................. 2003-167604

(51) Int. Cl.
*G11B 20/10* (2006.01)
(52) U.S. Cl. .................................. 369/59.23; 369/59.24
(58) Field of Classification Search ........................ None
See application file for complete search history.

(56) References Cited

U.S. PATENT DOCUMENTS

| | | | |
|---|---|---|---|
| 2,872,529 A | 2/1959 | Hollmann et al. | |
| 4,320,491 A | 3/1982 | Rustman | 369/126 |
| 4,455,638 A | 6/1984 | Wilson | 369/126 |
| 4,489,278 A | 12/1984 | Sawazaki | 324/457 |
| 5,047,649 A | 9/1991 | Hodgson et al. | |
| 5,132,934 A | 7/1992 | Quate et al. | |
| 5,226,029 A | 7/1993 | Takanashi et al. | |
| 5,412,641 A | 5/1995 | Shinjo et al. | |
| 5,418,029 A | 5/1995 | Yamamoto et al. | 428/64.2 |
| 5,481,527 A | 1/1996 | Kasanuki et al. | 369/126 |
| 5,488,602 A | 1/1996 | Yamano et al. | 369/126 |
| 5,490,132 A | 2/1996 | Yagi et al. | |
| 5,581,537 A | 12/1996 | Yamano et al. | 369/126 |
| 5,635,037 A | 6/1997 | Chu et al. | |
| 5,646,932 A | 7/1997 | Kuribayashi et al. | 369/126 |
| 5,724,336 A | 3/1998 | Morton | |
| 5,751,685 A | 5/1998 | Yi | 369/126 |
| 5,777,977 A | 7/1998 | Fujiwara et al. | 369/126 |
| 5,808,977 A | 9/1998 | Koyanagi et al. | 369/127 |
| 5,914,920 A | 6/1999 | Yokogawa | 369/275.3 |
| 5,946,284 A | 8/1999 | Chung et al. | 369/126 |

(Continued)

FOREIGN PATENT DOCUMENTS

EP    0 398 656 A2    11/1990

(Continued)

OTHER PUBLICATIONS

Cho et al, "Tbit/inch$^2$ ferroelectric data storage based on scanning nonlinear dielectric microscopy", Applied Physics Letters, vol. 81, No. 23, Dec. 2, 2002, pp. 4401-4403.

(Continued)

*Primary Examiner* — Paul Huber
(74) *Attorney, Agent, or Firm* — Nixon & Vanderhye P.C.

(57) ABSTRACT

The data to be recorded onto a recording medium is directly spread and then recorded onto the recording medium through a needle-shaped member, such as a probe. Upon reproducing the data, the data read from the recording medium is de-spread and reproduced.

22 Claims, 7 Drawing Sheets

U.S. PATENT DOCUMENTS

| | | | |
|---|---|---|---|
| 5,985,404 A | 11/1999 | Yano et al. | |
| 6,001,519 A | 12/1999 | Yang et al. | |
| 6,096,434 A | 8/2000 | Yano et al. | |
| 6,197,989 B1 | 3/2001 | Furukawa et al. | 556/450 |
| 6,249,503 B1 | 6/2001 | Aratani | |
| 6,272,083 B1 | 8/2001 | Aratani | |
| 6,477,132 B1 | 11/2002 | Azuma et al. | 369/126 |
| 6,510,130 B2 | 1/2003 | Hayashi et al. | 369/275.3 |
| 6,515,957 B1 | 2/2003 | Newns et al. | 369/126 |
| 6,606,726 B1 | 8/2003 | Wilhelmsson et al. | |
| 6,653,630 B2 | 11/2003 | Rosenman et al. | 250/306 |
| 6,762,402 B2 | 7/2004 | Choi et al. | 250/234 |
| 6,841,220 B2 | 1/2005 | Onoe et al. | 428/66.7 |
| 6,850,480 B1 | 2/2005 | Naito et al. | |
| 6,912,193 B2 | 6/2005 | Cho et al. | 369/126 |
| 6,942,914 B2 | 9/2005 | Onoe et al. | |
| 6,965,545 B2 | 11/2005 | Hino et al. | 369/13.54 |
| 7,065,033 B2 | 6/2006 | Onoe et al. | 369/126 |
| 7,149,180 B2 | 12/2006 | Onoe et al. | 369/276 |
| 7,151,739 B2 | 12/2006 | Cho et al. | |
| 7,212,484 B2 | 5/2007 | Maeda et a | |
| 7,218,600 B2 | 5/2007 | Cho et al. | |
| 7,221,639 B2 | 5/2007 | Onoe et al. | |
| 7,227,830 B2 | 6/2007 | Cho et al. | |
| 7,242,661 B2 | 7/2007 | Cho et al. | |
| 7,385,901 B2 | 6/2008 | Cho et al. | |
| 2002/0105249 A1 | 8/2002 | Yoshida et al. | 310/311 |
| 2002/0118906 A1 | 8/2002 | Onoe | 385/14 |
| 2002/0131669 A1 | 9/2002 | Onoe et al. | 385/14 |
| 2003/0021213 A1 | 1/2003 | Hagiwara | 369/101 |
| 2003/0053400 A1 | 3/2003 | Cho et al. | |
| 2003/0186090 A1 | 10/2003 | Onoe et al. | |
| 2004/0027935 A1 | 2/2004 | Cho et al. | 369/126 |
| 2004/0042351 A1 | 3/2004 | Onoe et al. | 369/13.01 |
| 2004/0090903 A1 | 5/2004 | Cho et al. | 369/126 |
| 2004/0105373 A1 | 6/2004 | Maeda et al. | 369/101 |
| 2004/0105380 A1 | 6/2004 | Cho et al. | 369/126 |
| 2004/0114913 A1 | 6/2004 | Kume | 386/125 |
| 2004/0252621 A1 | 12/2004 | Cho et al. | 369/126 |
| 2004/0263185 A1 | 12/2004 | Cho et al. | 324/636 |
| 2005/0047288 A1 | 3/2005 | Maeda et al. | 369/53.25 |
| 2005/0098532 A1 | 5/2005 | Onoe et al. | 216/22 |
| 2005/0099895 A1 | 5/2005 | Maeda et al. | 369/13.01 |
| 2005/0122886 A1 | 6/2005 | Takahashi et al. | 369/126 |
| 2006/0182004 A1 | 8/2006 | Maeda et al. | |
| 2006/0219655 A1 | 10/2006 | Cho et al. | |
| 2006/0245312 A1 | 11/2006 | Maeda et al. | |
| 2007/0014047 A1 | 1/2007 | Cho et al. | |

FOREIGN PATENT DOCUMENTS

| | | |
|---|---|---|
| EP | 0 480 183 | 4/1992 |
| EP | 0 739 004 | 11/1996 |
| EP | 1 091 355 A2 | 4/2001 |
| EP | 1 154 422 | 11/2001 |
| EP | 1 385 161 | 1/2004 |
| GB | 644 426 A | 10/1950 |
| GB | 1 484 256 | 9/1977 |
| JP | 55 139643 A | 10/1980 |
| JP | 56-107338 | 8/1981 |
| JP | 57-200956 | 12/1982 |
| JP | 59-22250 | 2/1984 |
| JP | 07334940 | 12/1995 |
| JP | 08-075806 | 3/1996 |
| JP | 9-222430 | 8/1997 |
| JP | 9-511863 | 11/1997 |
| JP | 10-334525 | 12/1998 |
| JP | 11-176033 | 7/1999 |
| JP | 2003-85969 | 3/2003 |
| WO | 00/36608 | 6/2000 |
| WO | WO 01/97385 A | 12/2001 |

OTHER PUBLICATIONS

Kazuta et al, "Determination of crystal polarities of piezoelectric thin film using scanning nonlinear dielectric microscopy", Journal of European Ceramic Society 21 (2001) 1581-1584.

The Institution of Electrical Engineers, Stevenage, GB; Jun. 1, 2002; Hiranaga et al, "Nano-sized inverted domain formation in stoichiometric LiTaO/sub3/single crystal using Scanning Nonlinear Dielectric Microscopy", XP002292217.

Cho et al, "Scanning nonlinear dielectric microscopy with nanometer resolution", Journal of European Ceramic Society 21 (2001) 2131-2134.

Cho et al., Nano domain engineering using scanning nonlinear dielectric microscopy, Oct. 29, 2001, IEE-NANO 2001, pp. 352-357.

DATA RECORDING / REPRODUCING APPARATUS AND METHOD USING NEEDLE-SHAPED MEMBER

CROSS-REFERENCE TO RELATED APPLICATION

This application is a divisional of application Ser. No. 10/866,197, filed Jun. 14, 2004.

BACKGROUND OF THE INVENTION

1. Field of the Invention

The present invention relates to a recording/reproducing apparatus for and a recording/reproducing method of recording data onto a recording medium at a high density by using a needle-shaped member, such as a probe and a cantilever, and reading and reproducing the data recorded on the recording medium at a high density by using the needle-shaped member.

2. Description of the Related Art

In the technical field of recording data onto the recording medium, it is required to improve the recording density of the data. With the aim of improving the recording density of the data, development proceeds in a technique of realizing the super high density recording and reproducing of the data by applying a technique of Scanning Probe Microscope (SPM).

For example, there is known a technique in which the data is recorded by forming a small hole onto a thin plastic film with the cantilever having a sharp nanoscale tip. The recording medium to which this technique is applied has not been marketed. However, it is expected to be put to practical use in the near future.

Moreover, there is known a technique of reproducing the data recorded on a ferroelectric thin film by using a technique of Scanning Nonlinear Dielectric Microscope (SNDM). In this technique, the data is recorded by locally applying an electric field stronger than a coercive electric field through a probe onto a thin film constructed from a ferroelectric substance, and thereby locally changing the polarization direction of the ferroelectric substance. Then, the data recorded on the ferroelectric thin film is read through the probe and reproduced (refer to Japanese Patent Application Laying Open NO. 2003-085969).

The diameter of the tip of the needle-shaped member, such as the cantilever and the probe, is on the order of nanometers. Therefore, the data can be recorded by a bit unit at nanometer order intervals. This makes it possible to realize the super high density recording. In fact, there is reported an example of realizing a data recording density of 1 terabit or more per 6.45 $cm^2$ (i.e. 1 $inch^2$) (e.g., refer to Yasuo Cho et al., "Tbit/$inch^2$ Ferroelectric Data Storage Based on Scanning Nonlinear Dielectric Microscopy", Applied Physics Letters, Vol. 81, No. 23 (2002), pp 4401-4403).

In the meantime, in the technical field of recording the data onto the recording medium, it is required not only to improve the recording density of the data but also to improve the recording and reading speed of the data. With the aim of improving the recording and reading speed of the data, development proceeds in a multi-probe type recording/reproducing apparatus. In the multi-probe type recording/reproducing apparatus, many probes or cantilevers are arranged on a head used for the recording and reading of the data, and many bit data is recorded or read substantially synchronously through the probes or the cantilevers. In fact, there is reported an example of arranging several hundreds to several thousands of cantilevers on one head, and of recording and reading the data at a high speed.

SUMMARY OF THE INVENTION

In the technical field of recording the data onto the recording medium, it is required to improve the reliability of the recording and reading of the data in addition to the improvement in the recording density of the data and the improvement in the recording and reading speed of the data. In order to realize the improvement in the reliability of the recording and reading of the data, it is preferable to improve noise resistance upon recording and reading the data.

Moreover, in the multi-probe type recording/reproducing apparatus, it is necessary to accurately and quickly separate many bit data synchronously read through many probes or cantilevers and certainly reproduce the content of the data. In order to realize this, a technique of highly accurately identifying, for each probe or cantilever, many bit data synchronously read through many probes or cantilevers is required.

It is therefore a first object of the present invention to provide a data recording/reproducing apparatus capable of realizing the data record and read with the superior noise resistance through the needle-shaped member.

It is a second object of the present invention to provide a data recording/reproducing apparatus capable of highly accurately identifying and separating the data read through many needle-shaped members and improving data reproduction performance.

The above object of the present invention can be achieved by a first recording/reproducing apparatus for recording data onto a recording medium and reading the data recorded on the recording medium, provided with: a needle-shaped member; a spreading device for generating spread data by performing direct sequence spectrum spreading processing with respect to the data by using a spreading code; a recording device for recording the spread data onto the recording medium through the needle-shaped member; a reading device for reading the spread data recorded by the recording device from the recording medium through the needle-shaped member; and a de-spreading device for performing de-spreading processing with respect to the spread data read from the recording medium by using the spreading code or a de-spreading code corresponding to the spreading code.

The above object of the present invention can be achieved by a second recording/reproducing apparatus for recording data onto a recording medium and reading the data recorded on the recording medium, provided with: a plurality of needle-shaped members; a spreading device for generating spread data by performing direct sequence spectrum spreading processing with respect to the data by individually multiplying respective bits of the data by a plurality of spreading codes which are mutually different; a recording device for recording the spread data onto the recording medium through the plurality of needle-shaped members; a reading device for reading the spread data recorded by the recording device from the recording medium through the plurality of needle-shaped members; and a de-spreading device for performing de-spreading processing with respect to the spread data read from the recording medium by using the plurality of spreading codes or a plurality of de-spreading codes respectively corresponding to the plurality of spreading codes.

The above object of the present invention can be achieved by a first recording apparatus for recording data onto a recording medium, provided with: a needle-shaped member; a spreading device for generating spread data by performing direct sequence spectrum spreading processing with respect to the data by using a spreading code; and a recording device for recording the spread data onto the recording medium through the needle-shaped member.

The above object of the present invention can be achieved by a second recording apparatus for recording data onto a recording medium, provided with: a plurality of needle-shaped members; a spreading device for generating spread data by performing direct sequence spectrum spreading processing with respect to the data by individually multiplying respective bits of the data by a plurality of spreading codes which are mutually different; and a recording device for recording the spread data onto the recording medium through the plurality of needle-shaped members.

The above object of the present invention can be achieved by a first reproducing apparatus for reproducing data from a recording medium onto which spread data generated by performing direct sequence spectrum spreading processing with respect to the data by using a spreading code is recorded, the reproducing apparatus provided with: a needle-shaped member; a reading device for reading the spread data from the recording medium through the needle-shaped member; and a de-spreading device for performing de-spreading processing with respect to the spread data read from the recording medium by using the spreading code or a de-spreading code corresponding to the spreading code.

The above object of the present invention can be achieved by a second reproducing apparatus for reproducing data from a recording medium onto which spread data generated by performing direct sequence spectrum spreading processing with respect to the data by individually multiplying respective bits of the data by a plurality of spreading codes which are mutually different is recorded, the reproducing apparatus provided with: a plurality of needle-shaped members; a reading device for reading the spread data recorded by the recording device from the recording medium through the plurality of needle-shaped members; and a de-spreading device for performing de-spreading processing with respect to the spread data read from the recording medium by using the plurality of spreading codes or a plurality of de-spreading codes respectively corresponding to the plurality of spreading codes.

The above object of the present invention can be achieved by a recording/reproducing method of recording data onto a recording medium through a needle-shaped member, and reading and reproducing the data recorded on the recording medium through the needle-shaped member, provided with: a spreading process of generating spread data by performing direct sequence spectrum spreading processing with respect to the data by using a spreading code; a recording process of recording the spread data onto the recording medium through the needle-shaped member; a reading process of reading the spread data recorded in the recording process from the recording medium through the needle-shaped member; and a de-spreading process of performing de-spreading processing with respect to the spread data read from the recording medium by using the spreading code or a de-spreading code corresponding to the spreading code.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

The embodiments of the present invention will be explained with reference to the drawings hereinafter. Incidentally, the drawings used to explain the embodiments of the present invention embody the constituent elements or the like of the embodiments of the present invention only for the purpose of explaining technical ideas thereof. The shape, size, position, connection relationship, and the like of various constituent elements or the like are not limited to the drawings.

(First Embodiment of Recording/Reproducing Apparatus)

Figure 1:
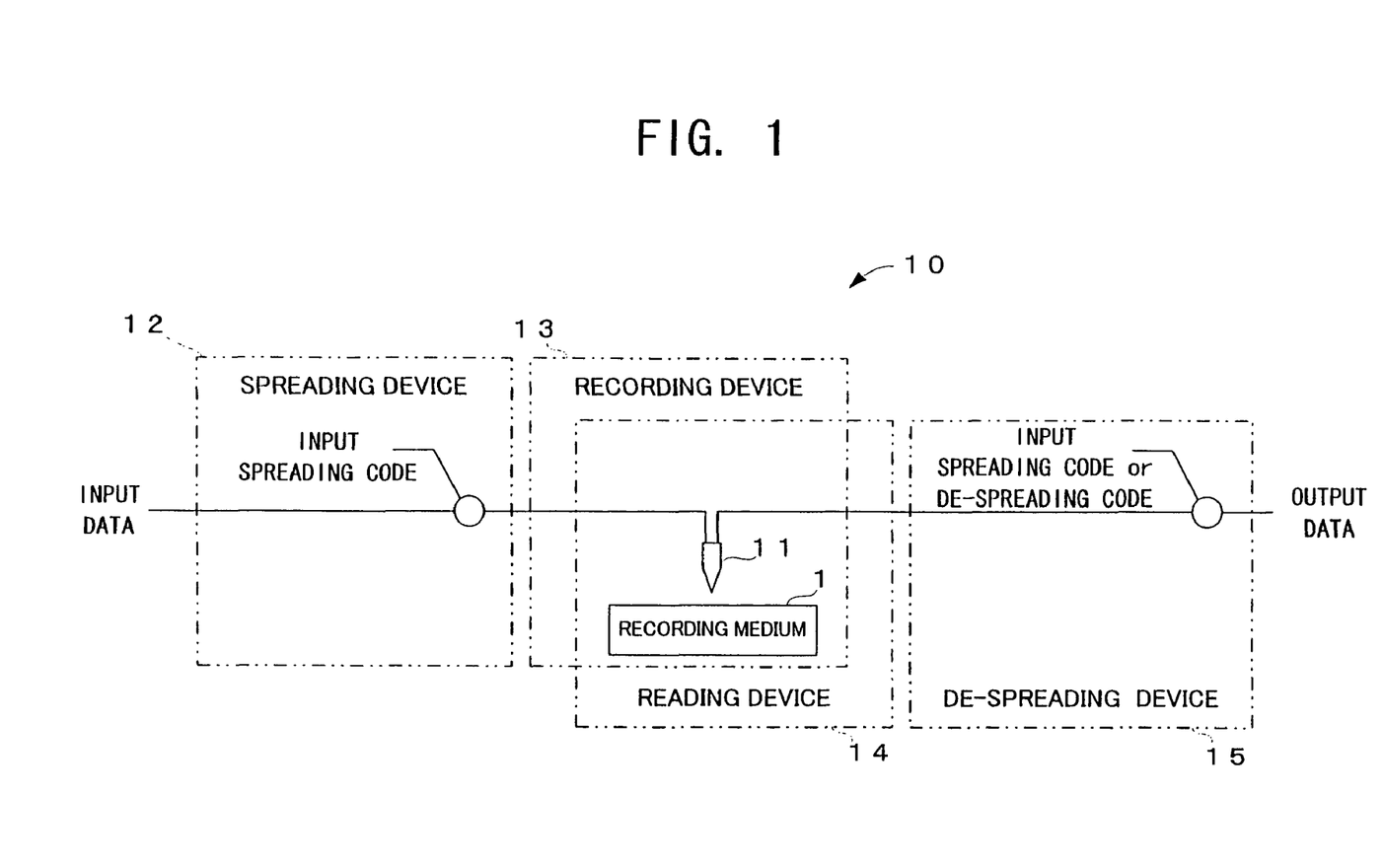
FIG. 1 is a circuit diagram showing a recording/reproducing apparatus in a first embodiment of the present invention.

The first embodiment of the present invention will be explained. FIG. 1 shows the structure of a recording/reproducing apparatus 10 in the first embodiment of the present invention. As shown in FIG. 1, the recording/reproducing apparatus 10 records data onto a recording medium 1 and reads the data recorded on the recording medium 1. The recording/reproducing apparatus 10 has a needle-shaped member 11. Through the needle-shaped member 11, it records the data onto the recording medium 1 and reads the data recorded on the recording medium 1. There are various methods of recording or reproducing the data with respect to the recording medium 1 through the needle-shaped member 11. For example, there is a method of recording the data by using a ferroelectric substance as the recording medium 1 and by applying an electric field to the recording medium 1 through the needle-shaped member 11 thereby to change the polarization direction of the ferroelectric substance. Moreover, there is a method of recording the data by using a plastic film, a polymer film, or a phase change material as the recording medium 1 and by making a hole or putting a mark onto the recording medium 1 with the needle-shaped member 11 heated. A method applied to the recording/reproducing apparatus 10 may be any one of the above methods or may be another method.

The needle-shaped member 11 has a sharp tip. The entire shape of the needle-shaped member 11 may be no object if the needle-shaped member 11 has the sharp tip. For example, the needle-shaped member 11 may be a probe or a cantilever. In order to record the data at a high density, it is preferable to decrease the area size of a recording area per unit data amount. From such a requirement or the like, the tip of the needle-shaped member 11 preferably has a diameter on the order of nanometers or sub-micron meters. A material constituting the needle-shaped member 11 can be appropriately selected in relation to the type of the recording medium 1 or the recording method. If the adopted recording method is the method of recording the data by using a ferroelectric substance as the recording medium 1 and by applying an electric field to the recording medium 1, at least the surface of the tip of the needle-shaped member 11 is preferably an electric conductor. As the electric conductor, it is possible to use tungsten, for example. In the case of setting the diameter of the tip of the needle-shaped member 11 to be on the order of nanometers, it is preferable to use a cantilever of high-doped silicon or conductive diamond, or a carbon nanotube (CNT).

As shown in FIG. 1, the recording/reproducing apparatus 10 is provided with: a spreading device 12; a recording device 13; a reading device 14; and a de-spreading device 15.

Figure 2:
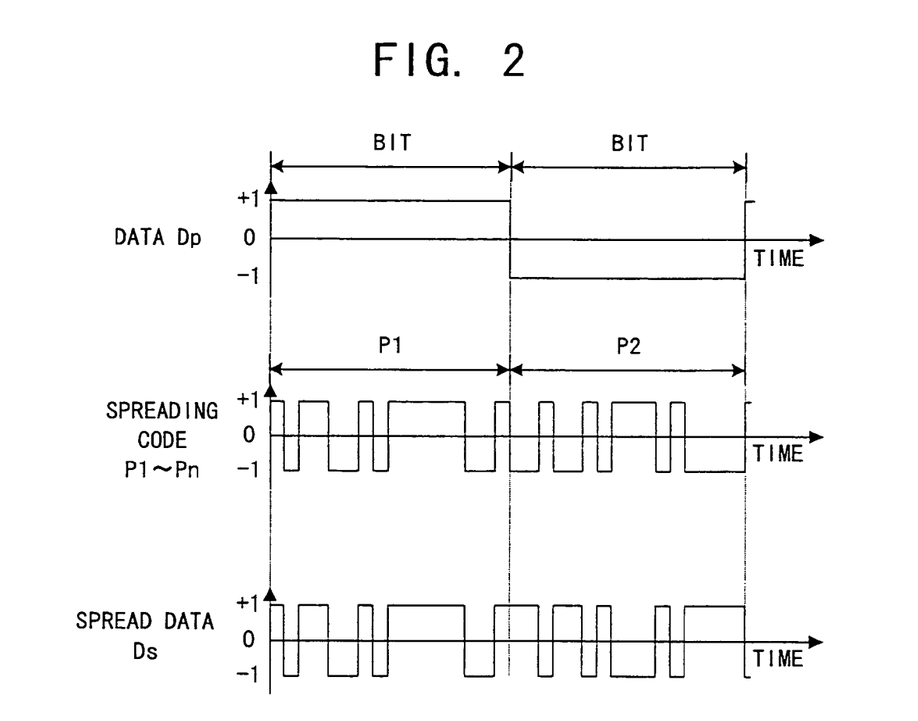
FIG. 2 is a waveform chart showing direct sequence spectrum spreading processing.

The spreading device 12 generates spread data by performing Direct Sequence Spectrum Spreading processing (DS-SS) with respect to the data to be recorded onto the recording medium 1 by using a spreading code. A general DS-SS method can be adopted to the DS-SS processing. The spreading code is preferably a code having pseudorandomization, periodicity, and orthogonality, and it is preferable to use a Pseudorandom Noise (PN) code. FIG. 2 shows one example of the DD-SS processing in the spreading device 12. As shown in FIG. 12, it multiplies each bit of data Dp to be recorded onto the recording medium 1 with any one of spreading codes P1 to Pn, thereby to generate spread data Ds.

Incidentally, the spreading code is preferably a code having pseudorandomization, periodicity, and orthogonality, but it is not necessarily provided with all of the pseudorandomization, periodicity, and orthogonality. For example, if the number of the needle-shaped member is one and if a noise amount possibly generated is small, it is sufficient to use a pulse row with a short period having a unique constant waveform as the spreading code. On the other hand, if the number of the needle-shaped members is several hundreds to several thousands and if the data is recorded at a time by using such many needle-shaped members and read at a time, the spreading code is preferably a code having pseudorandomization, periodicity, and orthogonality. That is because there is a need to highly accurately separate the data read at a time with many needle-shaped members.

Back in FIG. 1, the recording device 13 records the spread data onto the recording medium 1 through the needle-shaped member 11. The specific structure of the recording device 13 varies depending on the type of the recording medium 1 or the recording method. If the adopted recording method is the method of recording the data by using a ferroelectric substance as the recording medium 1 and by applying an electric field to the recording medium 1, the recording device 13 is provided with a line (or wiring) for supplying the spread data to the needle-shaped member 11; a mechanism for controlling a positional relationship between the needle-shaped member 11 and the recording medium 1; or the like. On the other hand, if the adopted recording method is the method of recording the data by using a thermal-changeable material, such as a plastic film and a phase change material, as the recording medium 1 and by making a hole or putting a mark onto the recording medium 1 with the needle-shaped member 11 heated, the recording device 13 is provided with an actuator for controlling the movement of the tip of the needle-shaped member 11 on the basis of the spread data; or the like, for example.

The reading device 14 reads the spread data recorded onto the recording medium 1 by the recording device 13 through the needle-shaped member 11 from the recording medium 1. The specific structure of the reading device 14 varies depending on the type of the recording medium 1 or the reproducing method.

Figure 3:
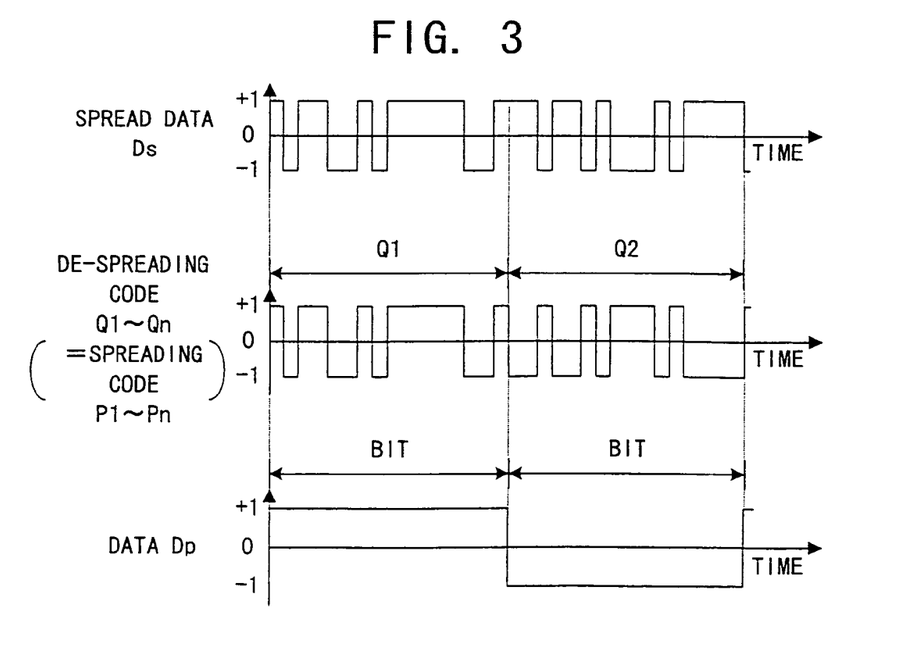
FIG. 3 is a waveform chart showing de-spreading processing.

The de-spreading device 15 performs de-spreading processing (or back spreading processing) with respect to the spread data read from the recording medium 1 by using the spreading code or a de-spreading code corresponding to the spreading code. The de-spreading processing of the de-spreading device 15 is processing of obtaining the original data before it is spread by the DS-SS processing from the spread data which is spread by the DS-SS processing of the spreading device 12. FIG. 3 shows one example of the de-spreading processing of the de-spreading device 15. As shown in FIG. 3, it multiplies the spread data Ds read from the recording medium 1 by the reading device 14 by at least or any one of de-spreading codes Q1 to Qn, thereby to generate original data Dp. In the embodiment shown in FIG. 3, the de-spreading codes Q1 to Qn are to be the same as the spreading codes P1 to Pn.

In the recording/reproducing apparatus 10, the data to be recorded onto the recording medium 1 is directly spread and recorded onto the recording medium 1. The data read from the recording medium 1 (the spread data) is de-spread and reproduced. As described above, the DS-SS of the data allows the data to have redundancy, thereby to improve the noise resistance of the data. As a result, it is possible to improve the Signal/Noise (SN) ratio of the data reproduction, and it is possible to increase the reliability of the recording and reproducing of the data. For example, if M bits of the PN code is used as the spreading code, it is possible to increase the SN ratio of the data reproduction 2M times as large.

(Specific Aspect of First Embodiment)

Figure 4:
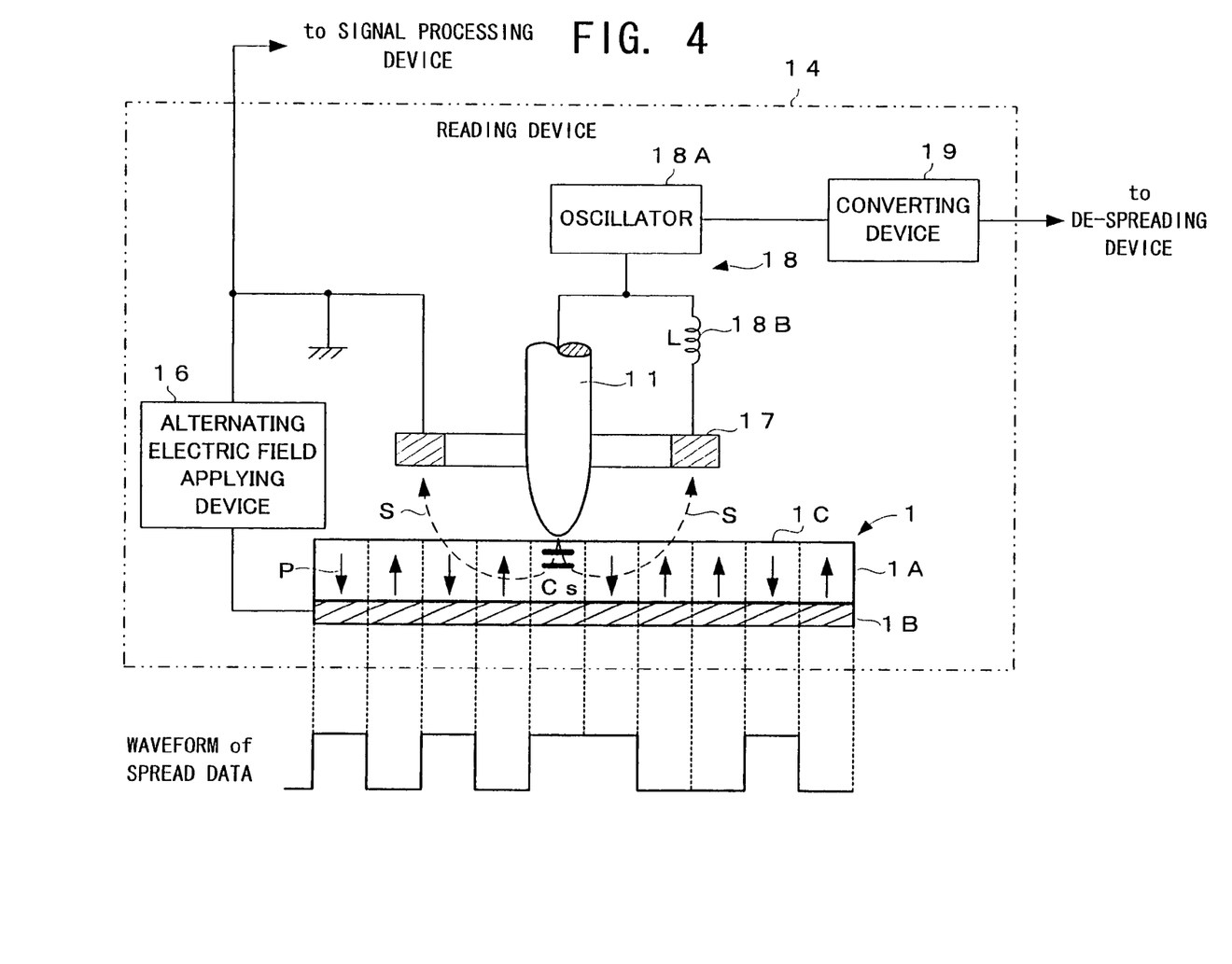
FIG. 4 is a circuit diagram showing one specific aspect of the recording/reproducing apparatus in the first embodiment of the present invention.

A more specific aspect of the recording/reproducing apparatus 10 will be explained. FIG. 4 shows one example of the more specific structures of the recording medium 1 and the recording/reproducing apparatus 10.

In the recording/reproducing apparatus 10, it is possible to adopt the recording method of recording the data (the spread data) by using a ferroelectric substance as the recording medium 1 and by locally applying an electric field stronger than the coercive electric field to the recording medium 1 through the needle-shaped member 11 thereby to locally change the polarization direction of the ferroelectric substance. In this case, as the reproducing method, it is preferable to use the reproducing method to which the principle of the SNDM is applied (hereinafter referred to as a "SNDM reproducing method").

The SNDM reproducing method is substantially as follows. An alternating electric field whose intensity does not reach that of the coercive electric field of the ferroelectric substance is applied to the ferroelectric substance, thereby to make a situation in which the differential capacitance of the ferroelectric substance changes alternately. The change in the differential capacitance varies according to the non-linear dielectric constant of the ferroelectric substance. The non-linear dielectric constant of the ferroelectric substance varies according to the polarization direction of the ferroelectric substance. As a result, by detecting the change in the differential capacitance, it is possible to measure the polarization direction of the ferroelectric substance. Since the data is recorded as the polarization direction of the ferroelectric substance, the data can be reproduced by measuring the polarization direction of the ferroelectric substance. The SNDM reproducing method is described in detail in the above-described Japanese Patent Application Laying Open NO. 2003-085969. The principle of the SNDM is described in "Oyo Butsuri", the Japan Society of Applied Physics, Vol. 67, No. 3, p 327-331 (1998).

In the case of using such a SNDM reproducing method, the recording medium 1 is preferably provided with a recording layer 1A constructed from a ferroelectric substance, as shown in FIG. 4. As the ferroelectric substance for the recording layer 1A, it is possible to use a ferroelectric material, such as lead titanate ($PbTiO_3$), lead zirconate ($PbZrO_3$), barium titanate ($BaTiO_3$), lithium niobate ($LiNiO_3$), and lithium tantalate ($LiTaO_3$). Incidentally, in the ferroelectric substance, the direction of spontaneous polarization is changed by applying a voltage thereto, and the polarization direction thereof is maintained even if the voltage is zero. The recording medium 1 may be plate-shaped or disc-shaped.

Moreover, in the case of using the SNDM reproducing method, the reading device 14 is preferably provided with: an alternating electric field applying device 16; a return electrode 17; an oscillating device 18; and a converting device 19, as shown in FIG. 4.

The alternating electric field applying device 16 applies an alternating electric field to the recording medium 1. The alternating electric field may be applied to the recording medium 1 through the needle-shaped member 11 or through another electrode. For example, as shown in FIG. 4, an electrode 1B may be provided on the back of the recording medium 1, and the alternating electric field may be applied through the electrode 1B.

The return electrode 17 is placed in vicinity of the needle-shaped member 11. The provision of the return electrode 17 causes the formation of a route through which a signal emitted from the tip of the needle-shaped member 11 passes the recording layer 1A just under the tip of the needle-shaped member 11 and returns to the return electrode 17 (refer to arrows S in FIG. 4). This route is one portion of the feedback of an oscillation circuit described later.

The return electrode 17 is preferably disposed on the one surface 1C side of the recording medium 1 as well as the needle-shaped member 11. This makes it possible to shorten the route of the signal emitting from the needle-shaped member 11, passing the recording layer 1A, and returning to the return electrode 17. The capacitance corresponding to the non-linear dielectric constant of the ferroelectric substance of the recording layer 1A changes slightly, and in order to highly accurately detect such a small capacitance change, it is necessary to avoid an influence, such as stray capacitance, as much as possible. By shortening the route from the needle-shaped member 11 to the return electrode 17, it is possible to decrease the influence of the stray capacitance. In FIG. 4, the return electrode 17 is formed in a ring shape and placed so as to surround the needle-shaped member 11. Incidentally, the shape of the return electrode 17 is not limited to the ring shape.

The oscillating device 18 generates a frequency modulation signal whose frequency is changed according to the capacitance Cs which is included in the capacitance between the needle-shaped member 11 and the return electrode 17 and which corresponds to the non-linear dielectric constant of the ferroelectric substance (the recording layer 1A) located just under the tip of the needle-shaped member 11. The specific structure of the oscillating device 18 can be variously considered. For example, as shown in FIG. 4, an oscillation circuit provided with: an oscillator 18A; an inductor 18B; the needle-shaped member 11; and a return electrode 14B may be formed and regarded as the oscillating device 18.

The operation of the oscillation circuit of the oscillating device 18 shown in FIG. 4 will be explained hereinafter. The spread data is recorded as the polarization direction of the ferroelectric substance of the recording layer 1A of the recording medium 1. Arrows P indicate the polarization direction of the dielectric substance. When the spread data is read, the oscillation circuit is driven, with the alternating electric field applied to the recording layer 1A by the alternating electric field applying device 16. This causes such a flow as the high frequency signal emits from the needle-shaped member 11 (especially, the tip of the needle-shaped member 11), passes the recording layer 1A, and returns to the return electrode 17, as shown in the arrows S. Then, the oscillation circuit oscillates at an oscillation frequency determined from an inductance L of the inductor 18B and the capacitance Cs just under the needle-shaped member 11. The difference in the polarization direction of the ferroelectric substance appears as the difference of the non-linear dielectric constant of the ferroelectric substance, and the difference of the non-linear dielectric constant appears as the change in the capacitance Cs. Then, the change in the capacitance Cs causes the change of the oscillation frequency of the oscillation circuit, thereby to generate the frequency modulation signal. The capacitance Cs is the capacitance of the ferroelectric substance located just under the tip of the needle-shaped member 11, as shown in FIG. 4. Therefore, if the diameter of the tip of the needle-shaped member 11 is made small (e.g. nanometer order), it is possible to detect the capacitance Cs in an extremely small area. This allows the extremely high resolution data read. Incidentally, the frequency of the frequency modulation signal in the oscillating device 18 is preferably set to be about 1 GHz on the average, for example. The frequency of the alternating electric field in the alternating electric field applying device 16 is preferably set to be about 5 kHz, for example.

The converting device 19 frequency-voltage converts the frequency modulation signal generated by the oscillating device 18. The change in the frequency of the frequency modulation signal is converted by the converting device 19 into the change in voltage. This signal is such that the voltage is changed correspondingly to the spread data recorded as the change in the polarization direction of the ferroelectric substance of the recording layer 1A. This signal is supplied from the converging device 19 to the de-spreading device 15.

According to the reading device 14 having the above structure, it is possible to realize the data reproduction by the SNDM reproducing method. According to the SNDM reproducing method, it is possible to increase the resolution of the data read and speed up the data read. Therefore, the super high density recording of the data and the high speed reading of the data can be realized by the SNDM reproducing method, and the superior noise resistance of the data can be realized by the DS-SS and de-spreading of the data by the spreading device 12 and the de-spreading device 15. Namely, it is possible to improve the recording density, reading speed, and reliability of the data at the same time.

Incidentally, in one aspect of the recording/reproducing apparatus 10, it may be provided with a bias voltage applying device for applying a direct current bias voltage to the recording medium 1 in place of the alternating electric field applying device 16. In the case of using the alternating electric field applying device 16, the processing speed of the data reproduction is restricted by the frequency of the alternating electric field. However, there is not such a restriction in the case of using the direct current bias voltage applying device in place of the alternating electric field applying device 16. In this regard, using the direct current bias voltage applying device facilitates more improvement in the processing speed of the data reproduction.

In the case of using the SNDM reproducing method as the reproducing method, the recording/reproducing apparatus 10 is preferably further provided with a signal processing device for extracting the original data from a signal obtained by that the de-spreading device 15 performs de-spreading processing with respect to the spread data read from the recording medium 1. By providing the signal processing device, it is possible to highly accurately extract the small change in the capacitance (i.e. electrostatic capacity) corresponding to the non-linear dielectric constant of the ferroelectric substance, thereby to realize the reproduction of the original data. As the signal processing device, a Phase Shift Keying (PSK) demodulator or a filter which allows only a predetermined frequency band to be passed (e.g. a band pass filter, a low pass filter, or a high pass filter) can be used, for example. In the case of applying the alternating electric field to the recording medium 1 by the alternating electric field applying device 16, it is preferable to use the PSK demodulator as the signal processing device. In this case, an alternating current signal outputted from the alternating electric field applying device 16 for the purpose of the application of the alternating electric field is supplied not only to the recording medium 1 but also to the PSK demodulator. The PSK demodulator refers to the alternating current signal outputted from the alternating electric field applying device 16 when extracting the original data from the signal obtained by that the de-spreading device 15 performs de-spreading processing. This makes it possible to highly accurately extract the original data.

On the other hand, in the case of providing the bias voltage applying device in place of the alternating electric field applying device 16 and applying the direct current bias voltage to the recording medium 1 by the bias voltage applying device, it is also possible to use the band pass filter as the signal processing device.

(Second Embodiment of Recording/Reproducing Apparatus)

Figure 5:
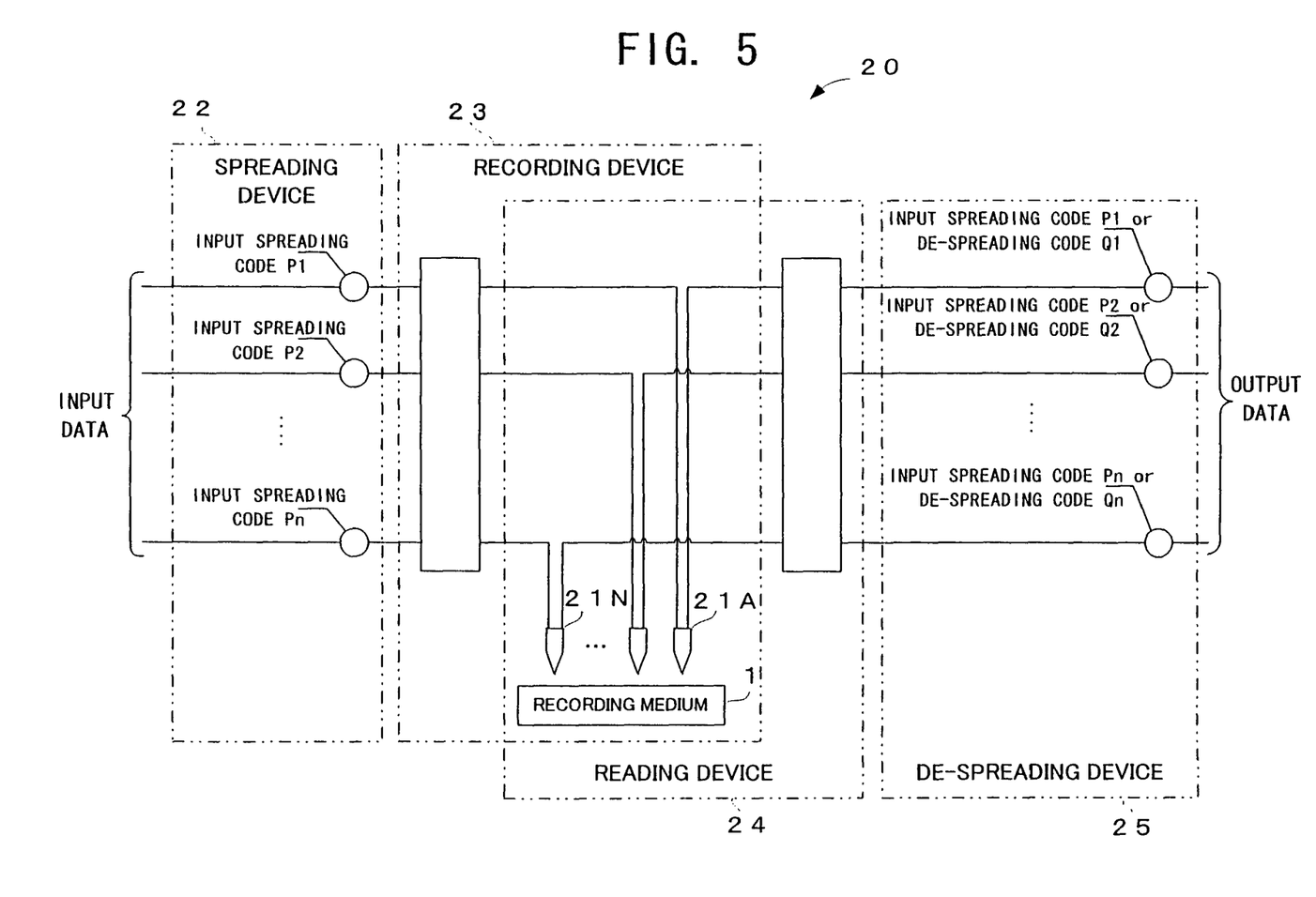
FIG. 5 is a circuit diagram showing a recording/reproducing apparatus in a second embodiment of the present invention.

The second embodiment of the present invention will be explained. FIG. 5 shows the structure of a recording/reproducing apparatus 20 in the second embodiment of the present invention. As shown in FIG. 5, the recording/reproducing apparatus 20 records data onto the recording medium 1 and reads the data recorded on the recording medium 1. The recording/reproducing apparatus 20 is provided with: a plurality of needle-shaped members 21A to 21N; a spreading device 22; a recording device 23; a reading device 24; and a de-spreading device 25.

The basic structure of the recording/reproducing apparatus 20 is substantially the same as that of the recording/reproducing apparatus 10. However, the recording/reproducing apparatus 10 has one needle-shaped member 11, while recording/reproducing apparatus 20 has the plurality of needle-shaped members 21A to 21N. The individual structures of the needle-shaped members 21A to 21N are the same as that of the needle-shaped member 11 in the recording/reproducing apparatus 10. The number of the needle-shaped members in the recording/reproducing apparatus 20 is not particularly limited. Using a micromachining technique or a nanomachining technique enables several to several thousand needle-shaped members to be formed on one substrate (or a head).

The spreading device 22 generates the spread data by performing DS-SS processing with respect to the data by individually multiplying respective bits of the data by a plurality of spreading codes which are mutually different. As the spreading code, it is preferable to use the PN code or the like. The recording device 23 records the spread data onto the recording medium 1 through the plurality of needle-shaped members 21A to 21N. The reading device 24 reads the spread data recorded by the recording device 23 from the recording medium 1 through the plurality of needle-shaped members 21A to 21N. The de-spreading device 25 performs de-spreading processing with respect to the spread data read from the recording medium 1 by using the plurality of spreading codes or the plurality of de-spreading codes respectively corresponding to the plurality of spreading codes.

In the recording/reproducing apparatus 20, upon recording the data onto the recording medium 1, the spreading device 22 generates a plurality of spread bit rows each of which corresponds to respective one of the bits of the data by individually multiplying the respective bits of the data by the plurality of spreading codes corresponding to the respective bits, for example. The recording device 23 distributes and supplies the plurality of spread bit rows to the plurality of needle-shaped members 21A to 21N for each spread bit row and records each spread bit row onto the recording medium 1. The needle-shaped members 21A to 21N are placed with them dispersed over or on the recording surface of the recording medium 1. As a result, the spread bit rows distributed and supplied to the needle-shaped members 21A to 21N are recorded with them dispersed on the recording surface of the recording medium 1. It is possible to increase a data recording speed by recording the data through the plurality of needle-shaped members 21A to 21N.

Upon reproducing the spread data (the spread bit rows) recorded on the recording medium 1, the reading device 24 reads the spread bit rows recorded with them dispersed on the recording surface of the recording medium 1 through the plurality of needle-shaped members 21A to 21N. The de-spreading device 25 performs de-spreading processing with respect to each of the spread bit rows read through the plurality of needle-shaped members 21A to 21N by using the plurality of spreading codes or de-spreading codes. The plurality of spreading codes or de-spreading codes used in the de-spreading device 25 are the same as or correspond to the plurality of spreading codes used in the spreading device 22. Thus, the plurality of spreading codes or de-spreading codes are mutually different codes. By performing de-spreading processing by using the plurality of spreading codes or de-spreading codes which are mutually different, it is possible to highly accurately identify and separate the plurality of spread bit rows. As a result of the de-spreading processing, it is possible to certainly reproduce each bit of the data (i.e. the original data) corresponding to respective one of the spread bit rows.

As described above, in the recording/reproducing apparatus 20, it is possible not only to increase the noise resistance of the data but also to highly accurately identify and separate the plurality of data read through the plurality of needle-shaped members 21A to 21N, by directly spreading the data and recording it onto the recording medium 1 and by de-spreading and reproducing the spread data (the spread bit rows) read from the recording medium 1 upon reproducing. This makes it possible to prevent the accuracy of the data reproduction from decreasing even if the number of the needle-shaped members is increased in order to realize the high speed recording and high speed reading of the data. Therefore, it is possible to try to speed up the data record and read and to improve the certainty of the data reproduction at the same time.

(Specific Aspect of Second Embodiment)

A more specific aspect of the recording/reproducing apparatus 20 will be explained. Even in the reading device 24 of the recording/reproducing apparatus 20, the SNDM reproducing method can be adopted, in substantially the same manner in the reading device 14 of the recording/reproducing apparatus 10. In this case, the recording medium 1 and the reading device 24 are preferably as follows.

The recording medium 1 is made to be a ferroelectric recording medium provided with a recording layer constructed from a ferroelectric substance. The reading device 24 is provided with: an alternating electric field applying device for applying an alternating electric field to the recording medium 1; a return electrode; an oscillating device for generating a frequency modulation signal whose frequency is changed according to capacitance which is included in capacitance between each of the plurality of needle-shaped members 21A to 21N and the return electrode and which corresponds to a non-linear dielectric constant of the ferroelectric substance located just under a tip of each of the plurality of needle-shaped members 21A to 21N; and a converting device for frequency-voltage converting the frequency modulation signal generated by the oscillating device. According to such a structure, it is possible to try to speed up the data record and read further, to improve the noise resistance of the data, and to improve the certainty of the data reproduction at the same time. Incidentally, the reading device 24 may be provided with a bias voltage applying device for applying a direct current bias voltage to the recording medium in place of the alternating electric field applying device.

In the case of using the SNDM reproducing method as the reproducing method, the recording/reproducing apparatus 20 is preferably further provided with a signal processing device for extracting the original data from a signal obtained by that the de-spreading device 25 performs de-spreading processing with respect to the spread data read from the recording medium 1. By providing the signal processing device, it is possible to highly accurately extract the small change in the capacitance (i.e. electrostatic capacity) corresponding to the non-linear dielectric constant of the ferroelectric substance, thereby to realize the reproduction of the original data. As the signal processing device, a Phase Shift Keying (PSK) demodulator can be used, for example. In the case of applying the alternating electric field to the recording medium 1 by the alternating electric field applying device, an alternating current signal outputted from the alternating electric field applying device for the purpose of the application of the alternating electric field is supplied not only to the recording medium 1 but also to the PSK demodulator. The PSK demodulator refers to the alternating current signal outputted from the alternating electric field applying device when extracting the original data from the signal obtained by that the de-spreading device 25 performs de-spreading processing. This makes it possible to highly accurately extract the original data. Particularly, it is preferable to provide a plurality of PSK demodulator so as to correspond to the number of the needle-shaped members 21A to 21N. Moreover, in this case, it is also possible to provide a plurality of alternating electric field applying devices so as to correspond to the number of the needle-shaped members 21A to 21N, and it is possible to set the frequency of the alternating current signal outputted from each of the plurality of alternating electric field applying devices to be mutually different. This makes it possible to highly accurately extract the original data from the individual spread data read through each of the needle-shaped members 21A to 21N.

Incidentally, each of the above-described recording/reproducing apparatuses 10 and 20 is provided with: the structure for realizing the recording of the data onto the recording medium 1; and the structure for realizing the reading and reproducing of the data recorded on the recording medium 1. However, the embodiments of the present invention are not limited to this. For example, it is possible to extract only the structure for realizing the recording of the data onto the recording medium 1 (the needle-shaped member or members, the spreading device, and the recording device) to regard it as a recording apparatus. Moreover, it is possible to extract only the structure for realizing the reading and reproducing of the data recorded on the recording medium 1 (the needle-shaped member or members, the reading device, and the de-spreading device) to regard it as a reproducing apparatus.

(Embodiment of Recording/Reproducing Method)

The embodiment of the recording/reproduction method of the present invention will be explained. The recording/reproducing method of the present invention is a method of recording data onto a recording medium through a needle-shaped member, and reading and reproducing the data recorded on the recording medium through the needle-shaped member.

The recording/reproducing method is provided with: a spreading process of generating spread data by performing direct sequence spectrum spreading processing with respect to the data by using a spreading code; a recording process of recording the spread data onto the recording medium through the needle-shaped member; a reading process of reading the spread data recorded in the recording process from the recording medium through the needle-shaped member; and a de-spreading process of performing de-spreading processing with respect to the spread data read from the recording medium by using the spreading code or a de-spreading code corresponding to the spreading code.

In the recording/reproducing method, the data record is realized by the spreading process and the recording process. These processes cause that the data is directly spread and recorded onto the recording medium with it as the spread data. The data reproduction is realized by the reading process and the de-spreading process. These processes cause that the spread data recorded on the recording medium is read from the recording medium and de-spread, thereby to reproduce the original data. The DS-SS of the data allows the increase in the noise resistance of the data. Therefore, if the recording/reproducing method is applied to the recording/reproducing apparatus to which the SNDM reproducing method is adopted, it is possible to try to improve the reliability of the data reproduction, at the same time of the high speed recording and high speed reproducing of the data.

EXAMPLES

The examples of the present invention will be explained hereinafter. The examples below are such that the recording/reproducing apparatus of the present invention is applied to a multi-probe type recording/reproducing apparatus to which the SNDM reproducing method is adopted.

First Example

Figure 6:
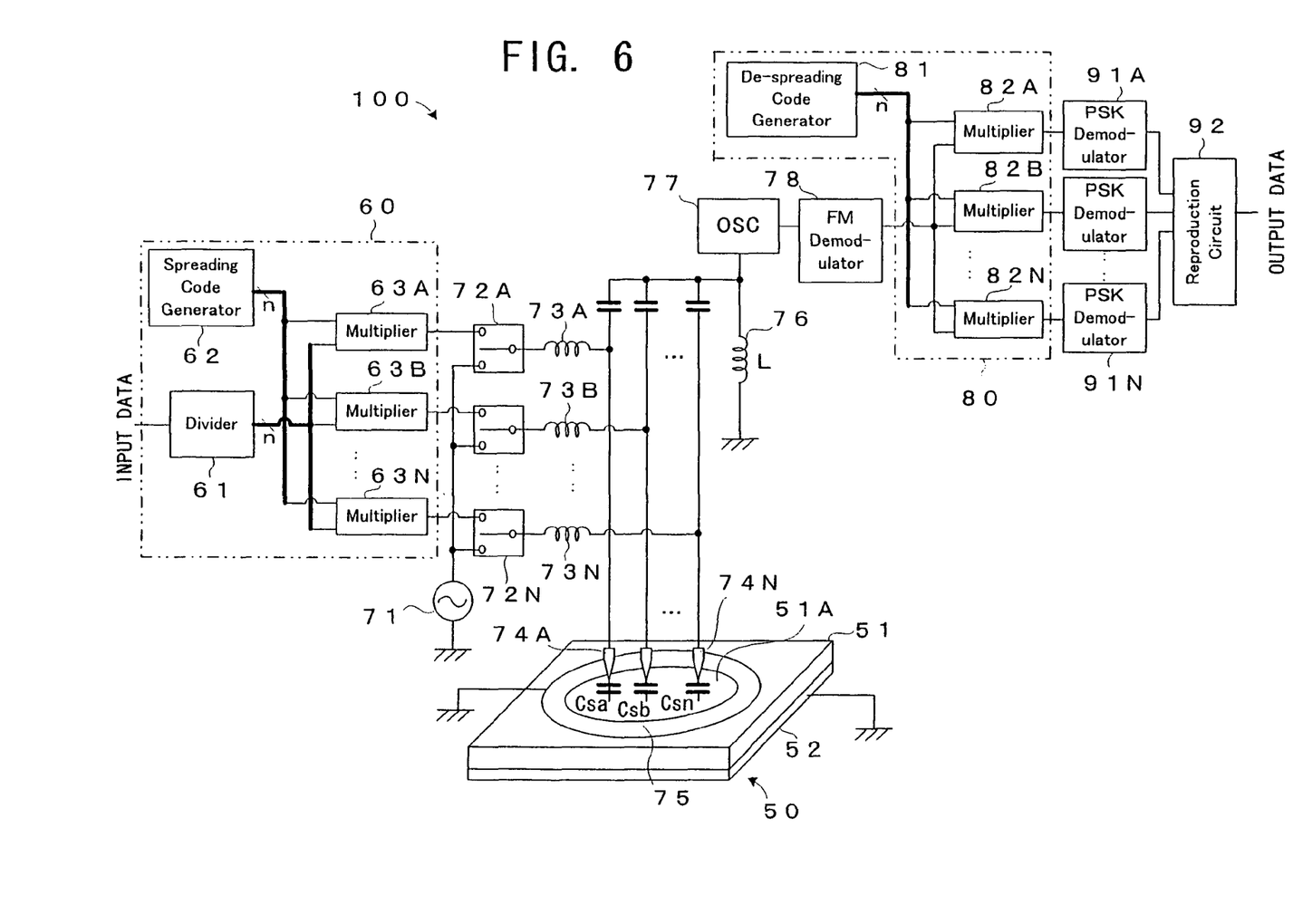
FIG. 6 is a circuit diagram showing a recording/reproducing apparatus in a first example of the present invention.

FIG. 6 shows the structure of a recording/reproducing apparatus 100 in the first example of the present invention. The recording/reproducing apparatus 100 records data onto a ferroelectric recording medium 50 and reads the data recorded on the ferroelectric recording medium 50. The SNDM reproducing method is adopted to the recording/reproducing apparatus 100.

As shown in FIG. 6, the ferroelectric recording medium 50 is provided with: a recording layer 51; and a back electrode (or a back plate) 52.

The recording layer 51 is constructed from a ferroelectric material. As the ferroelectric material, lithium tantalate ($LiTaO_3$) is used, for example. The recording layer 51 is formed in a thin film shape, and a recording surface 51A is formed on one surface thereof.

The back electrode 52 is an electric conductor and placed on the opposite surface to the recording surface 51A of the recording layer 51. The back electrode 52 is earthed.

The recording/reproducing apparatus 100 is provided with: a spread processor 60; an alternating electric field generator 71; switches 72A to 72N; first inductors 73A to 73N; probes 74A to 74N; a return electrode 75; a second inductor 76; an oscillator 77; a Frequency Modulation (FM) demodulator 78; a de-spreading processor 80; Phase Shift Keying (PSK) demodulators 91A to 91N; and a reproduction circuit 92.

The spread processor 60 is provided with: a divider 61; a spreading code generator 62; and multipliers 63A to 63N.

When the data to be recorded (hereinafter referred to as "record data") onto the ferroelectric recording medium 50, the divider 61 receives the record data, divides the record data into bits, and distributes and supplies each of the divided bits (hereinafter referred to as "record bits") to respective one of the multipliers 63A to 63N. Namely, it is such that the first record bit is supplied to the multiplier 63A, that the second record bit is supplied to the multiplier 63B, and the like.

The spreading code generator 62 generates the spreading codes. The spreading codes are the PN codes. More specifically, general PN code series, such as M series and Gold series, are used as the spreading codes. The bit number m of the spreading codes is determined in consideration of the number n of the probes 74A to 74N. Namely, the bit number m of the spreading codes is determined to satisfy $2^m \geq n$. This causes the spreading code generator 62 to generate the spreading codes of at least n units which are mutually different. The spreading codes are used for the DS-SS of the record data by the multiplication by the respective bits of the record data. Therefore, the bit rate of the PN code series for the generation of the spreading codes is faster than that of the record data. The spreading code generator 62 is provided with: a shift resister for generating such spreading codes; an adder; or the like. Each of the spreading codes of n units generated by the spreading code generator 62 is supplied to respective one of the multipliers 63A to 63N. Namely, it is such that the first spreading code is supplied to the multiplier 63A, that the second spreading code is supplied to the multiplier 63B, and the like.

Each of the multipliers 63A to 63N multiplies the spreading code and the record bit, thereby to generate the spread bit row. The number of the multipliers 63A to 63N is the same as the number of the probes 74A to 74N. Each of the spread bit rows generated by the multipliers 63A to 63N is supplied to respective one of the first input terminals of the switches 74A to 74N.

The alternating electric field generator 71 generates an alternating current signal. The frequency of the alternating current signal is about 5 kHz, for example. The intensity of the alternating current signal is set not to reach that of the coercive electric field of the ferroelectric substance constituting the recording layer 51 of the ferroelectric recording medium 50. The alternating current signal generated by the alternating electric field generator 71 is supplied to each of the second input terminals of the switches 72A to 72N. This alternating current signal is used to generate an alternating electric field onto the ferroelectric substance of the recording layer 51 upon reproducing the record data recorded on the ferroelectric recording medium 50.

Each of the switches 72A to 72N switches whether to supply the spread bit row inputted to the first input terminal thereof to the side of the probes 74A to 74N or to supply the alternating current signal inputted to the second input terminal thereof to the side of the probes 74A to 74N. Upon recording the record data onto the ferroelectric recording medium 50, each of the switches 72A to 72N is switched so that the spread bit row inputted to the first input terminal thereof is supplied to respective one of the probes 74A to 74N.

On the other hand, upon reproducing the record data recorded on the ferroelectric recording medium 50, each of the switches 72A to 72N is switched so that the alternating current signal inputted to the second input terminal thereof is supplied to respective one of the probes 74A to 74N. Incidentally, the switching of the switches 72A to 72N is controlled by a control circuit placed inside the recording/reproducing apparatus 100 (not-illustrated). Each of the spread bit rows or the alternating current signal is supplied through the switches 72A to 72N and the first inductors 73A to 73N to the probes 74A to 74N, respectively.

Each of the probes 74A to 74N is the needle-shaped member having the tip with a diameter of several nanometers, and it is constructed from a carbon nanotube, for example. The number of the probes 74A to 74N is several tens to several hundreds. The fundamental end (or anchor) side of the probes 74A to 74N is fixed to a head substrate. The probes 74A to 74N are placed at predetermined intervals in a matrix shape on the head substrate. Incidentally, the drawing of the accurate arrangement of the probes 74A to 74N is omitted in FIG. 6. The head substrate is placed above the recording surface 51A of the ferroelectric recording medium 50 with a space. The probes 74A to 74N are placed to project from the head substrate to the recording surface 51A. Upon recording or reading the record data, the tips of the probes 74A to 74N are approached to the recording surface 51A. An interval between each of the probes 74A to 74N and the recording surface 51A is several nanometers, for example. The head substrate or the ferroelectric recording medium 50 can be moved in the parallel and vertical directions to the recording surface 51A, and this movement is controlled by the control circuit placed inside the recording/reproducing apparatus 100 (not-illustrated).

Upon recording the record data onto the ferroelectric recording medium 50, the head substrate or the ferroelectric recording medium 50 is moved in the vertical direction to the recording surface 51A by the control by the control circuit inside the recording/reproducing apparatus 100, and the tips of the probes 74A to 74N are approached to the recording surface 51A. In this condition, each of the spread bit rows is supplied to respective one of the probes 74A to 74N. The spread bit row is supplied as a signal having intensity stronger than the coercive electric field of the ferroelectric substance of the recording layer 51. At this time, the head substrate or the ferroelectric recording medium 50 is moved in the parallel direction to the recording surface 51A at a predetermined speed by the control by the control circuit inside the recording/reproducing apparatus 100. This causes the polarization direction of the ferroelectric substance of the recording layer 51 just under each of the probes 74A to 74N (especially, the each tips of the probes 74A to 74N) to change (reverse) correspondingly to the bit state of the spread bit row. As a result, the spread bit row is recorded as the polarization direction of the ferroelectric substance.

The return electrode 75 is placed above the recording surface 51A with a space and placed to surround the probes 74A to 74N. The return electrode 75 is earthed. In order to read and reproduce the data, a high frequency electric field applied by the oscillator 77 or the like to the ferroelectric recording medium 50 returns to the earth side through the return electrode 75 (refer to FIG. 4).

The second inductor 76 forms a resonance circuit with each of the capacitances Csa to Csn just under the probes 74A to 74N. The resonance frequency is determined from an inductance L of the second inductor 76 and each of the capacitances Csa to Csn.

The oscillator 77 generates a high frequency signal which oscillates at the resonance frequency determined from the inductance L and each of the capacitances Csa to Csn. The average frequency of the high frequency signal is about 1 GHz.

Upon reproducing the record data recorded on the ferroelectric recording medium 50, the head substrate or the ferroelectric recording medium 50 is moved in the vertical direction to the recording surface 51A by the control by the control circuit inside the recording/reproducing apparatus 100, and the tips of the probes 74A to 74N are approached to the recording surface 51A. In this condition, the alternating current signal generated by the alternating electric field generator 71 is supplied to each of the probes 74A to 74N. This generates the alternating electric field onto the ferroelectric substance of the recording layer 51, and each of the capacitances Csa to Csn changes on the basis of the alternating electric field. This causes the change in the resonance frequency determined from the inductance L and each of the capacitances Csa to Csn, so that the frequency of the high frequency signal generated by the oscillator 77 changes. How each of the capacitances Csa to Csn changes (i.e., the change of each differential capacitance) varies depending on the non-linear dielectric constant of the ferroelectric substance of the recording layer 51 located just under respective one of the probes 74A to 74N. Moreover, the non-linear dielectric constant of the ferroelectric substance varies depending on the polarization direction of the ferroelectric substance located just under each of the probes 74A to 74N. Therefore, the bit state of the spread bit row recorded as the polarization direction of the ferroelectric substance just under each of the probes 74A to 74N appears as the difference in how respective one of the capacitances Csa to Csn changes (i.e., the change of each differential capacitance). The difference in the change of each differential capacitance is converted into the change in the frequency of the high frequency signal as it is. This means that the high frequency signal generated by the oscillator 77 is frequency-modulated according to each of the spread bit rows recorded on the ferroelectric recording medium 50. As described above, while the alternating current signal generated by the alternating electric field generator 71 is applied to the recording surface 51A, the head substrate or the ferroelectric recording medium 50 is moved in the parallel direction to the recording surface 51A at a predetermined speed by the control by the control circuit inside the recording/reproducing apparatus 100. This causes the sequential change in the frequency of the high frequency signal according to each of the spread bit rows recorded on the ferroelectric recording medium 50. This is how to read each of the spread bit rows recorded on the ferroelectric recording medium 50.

The FM demodulator 78 frequency-voltage converts the high frequency signal outputted from the oscillator 77. This causes the change in the frequency of the high frequency signal to be converted into the change in voltage. As a result, a signal whose voltage is changed according to each of the spread bit rows recorded on the ferroelectric recording medium 50 is obtained (hereinafter referred to as a "spread bit row signal"). The spread bit row signal is supplied to each of the multiplier 82A to 82N of the de-spreading processor 80.

The de-spreading processor 80 is provided with: a de-spreading code generator 81; and the multiplier 82A to 82N. The de-spreading code generator 81 generates the de-spreading codes. The de-spreading codes correspond to the spreading codes generated by the spreading code generator 62. Since there are the spreading codes of n units, the de-spreading codes of n units are generated. Each of the de-spreading codes is supplied to respective one of the multiplier 82A to 82N. Namely, it is such that the first de-spreading code is supplied to the multiplier 82A, that the second de-spreading code is supplied to the multiplier 82B, and the like.

Each of the multipliers 82A to 82N multiplies the de-spreading code and the spread bit row signal, thereby to reproduce the record bit of the original record data. The number of the multipliers 82A to 82N is the same as the number of the probes 74A to 74N. Each of the record bits reproduced by the multipliers 82A to 82N is supplied to respective one of the PSK demodulator 91A to 91N.

Each of the PSK demodulator 91A to 91N extracts the record bit from a signal outputted from respective one of the multipliers 82A to 82N. Namely, the record bit is reproduced in each of the multipliers 82A to 82N, but the record bit is buried in the signal including various noises. Each of the PSK demodulator 91A to 91N extracts the record bit from the signal including various noises. Each of the PSK demodulator 91A to 91N is a lock-in amplifier, for example. Upon extracting the record bit, the alternating current signal generated by the alternating electric field generator 71 is used as a reference signal. Each of the record bits extracted by the PSK demodulator 91A to 91N is supplied to the reproduction circuit 92.

The reproduction circuit 92 combines the record bits supplied from the PSK demodulator 91A to 91N, thereby to reproduce the original record data.

As described above, upon recording the record data onto the ferroelectric recording medium 50 in the recording/reproducing apparatus 100, the record data is divided into the bits, and each of the bits is multiplied by respective one of the spreading codes of n units which are mutually different. This generates the spread bit row corresponding to each of the bits of the record data. Each of the spread bit rows is distributed and supplied to respective one of the probes 74A to 74N and recorded onto the ferroelectric recording medium 50 through respective one of the probes 74A to 74N. Since the probes 74A to 74N are placed on the head substrate in a matrix shape, the spread bit rows are recorded with them dispersed on the recording surface 51A of the ferroelectric recording medium 50.

On the other hand, upon reproducing the record data (the spread bit rows) recorded on the ferroelectric recording medium 50, the alternating electric field is generated and applied to the ferroelectric substance of the recording surface 51A. By this, each of the spread bit rows recorded on the ferroelectric recording medium 50 is read as the change in respective one of the capacitances Csa to Csn just under the probes 74A to 74N (which is accurately the change in each differential capacitance). It is converted into the change in the frequency of the high frequency signal and further converted into the change in voltage of the spread bit row signal. In addition, the spread bit row signal is multiplied by each of the de-spreading codes of n units, thereby to generate the record bit. Lastly, the record bits are combined, thereby to reproduce the original record data.

As described above, in the recording/reproducing apparatus 100, the record data is recorded onto the ferroelectric recording medium 50 by the DS-SS of the record data. Upon reproducing, the record data (the spread bit rows) recorded on ferroelectric recording medium 50 is read, de-spread, and reproduced. This makes it possible to spread various noises in a broad range by the de-spreading processing, the various noises being such as a defect on the recording surface 51A of the ferroelectric recording medium 50, a noise generated upon reading the record data, and a noise generated upon reproducing the read record data. Thus, it is possible to highly accurately extract only the record data to be reproduced. This allows the improvement in the noise resistance of the data and the increase in the reliability of the data reproduction.

In the recording/reproducing apparatus 100, each of the bits of the record data is multiplied by respective one of the spreading codes which are mutually different, thereby to generate the spread bit row. The spread bit rows are dispersed through respective probes 74A to 74N, thereby to record them. Then, upon reproducing, each of the spread bit rows read through the probes 74A to 74N is multiplied by respective one of the de-spreading codes which are mutually different, thereby to reproduce each bit of the original record data. In this manner, it is possible to highly accurately and individually separate and extract the record bits of the record data on the basis of the spread bit rows simultaneously and individually read through the probes 74A to 74N. For example, in some cases, a signal read through one probe includes a signal component read through another probe placed around the one probe as a noise. Even in this case, the noise of interest can be spread in a broad range by the de-spreading processing, and thus it is possible to certainly extract only information to be read by the one probe. Therefore, it is possible to realize the high speed reading of the data by many probes and the improvement in the reliability and certainty of the data reproduction at the same time.

Second Example

Figure 7:
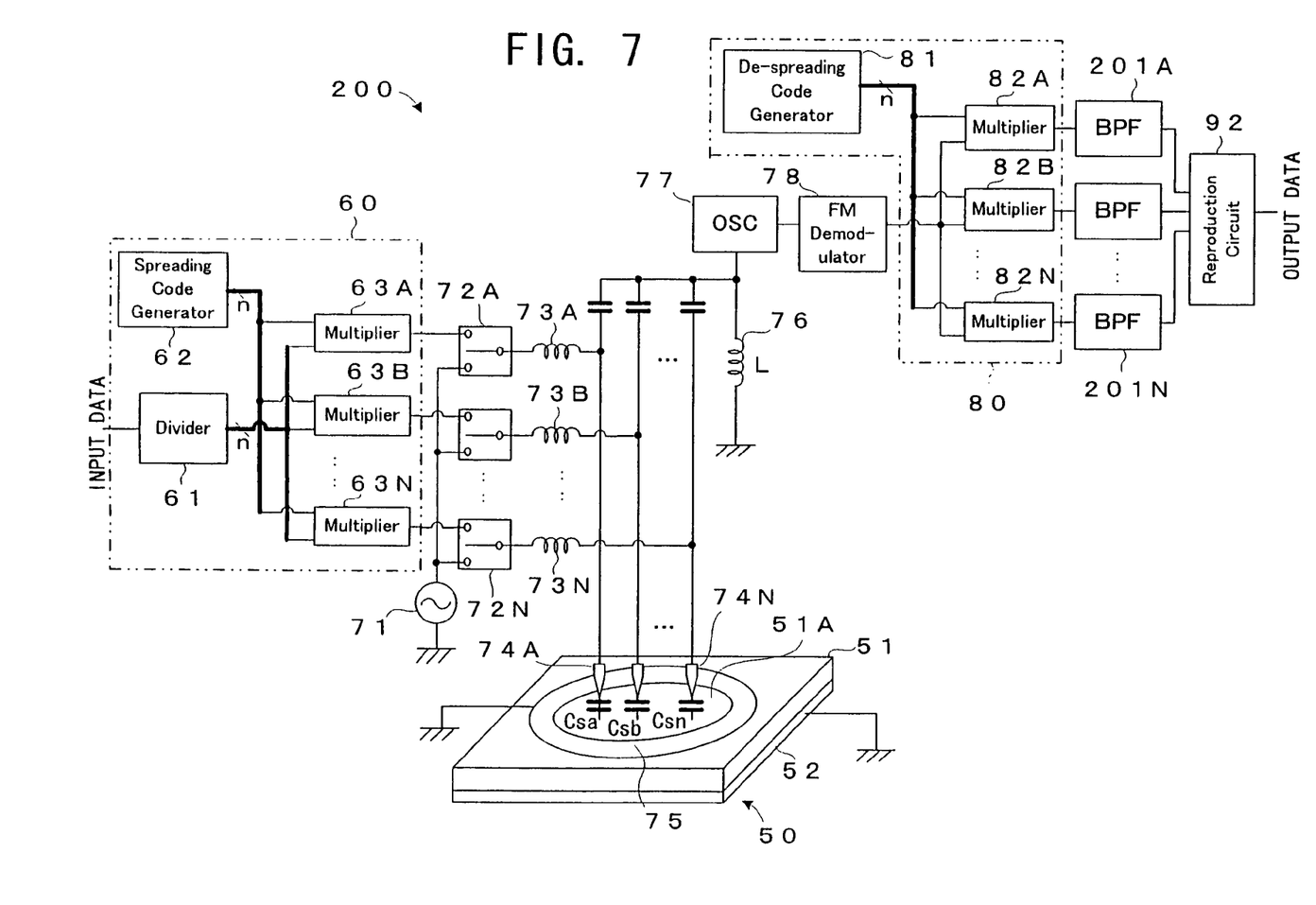
FIG. 7 is a circuit diagram showing a recording/reproducing apparatus in a second example of the present invention.

FIG. 7 shows the structure of a recording/reproducing apparatus 200 in the second example of the present invention. The recording/reproducing apparatus 200 is provided with band pass filters (BPFs) 201A to 201N in place of the PSK demodulators 91A to 91N of the recording/reproducing apparatus 100. Each of the BPFs 201A to 201N extracts the record bit from a signal outputted from respective one of the multipliers 82A to 82N.

It is possible to improve the reliability and certainty of the data reproduction even by the recording/reproducing apparatus 200 having such a structure, as with the recording/reproducing apparatus 100.

Third Example

Figure 8:
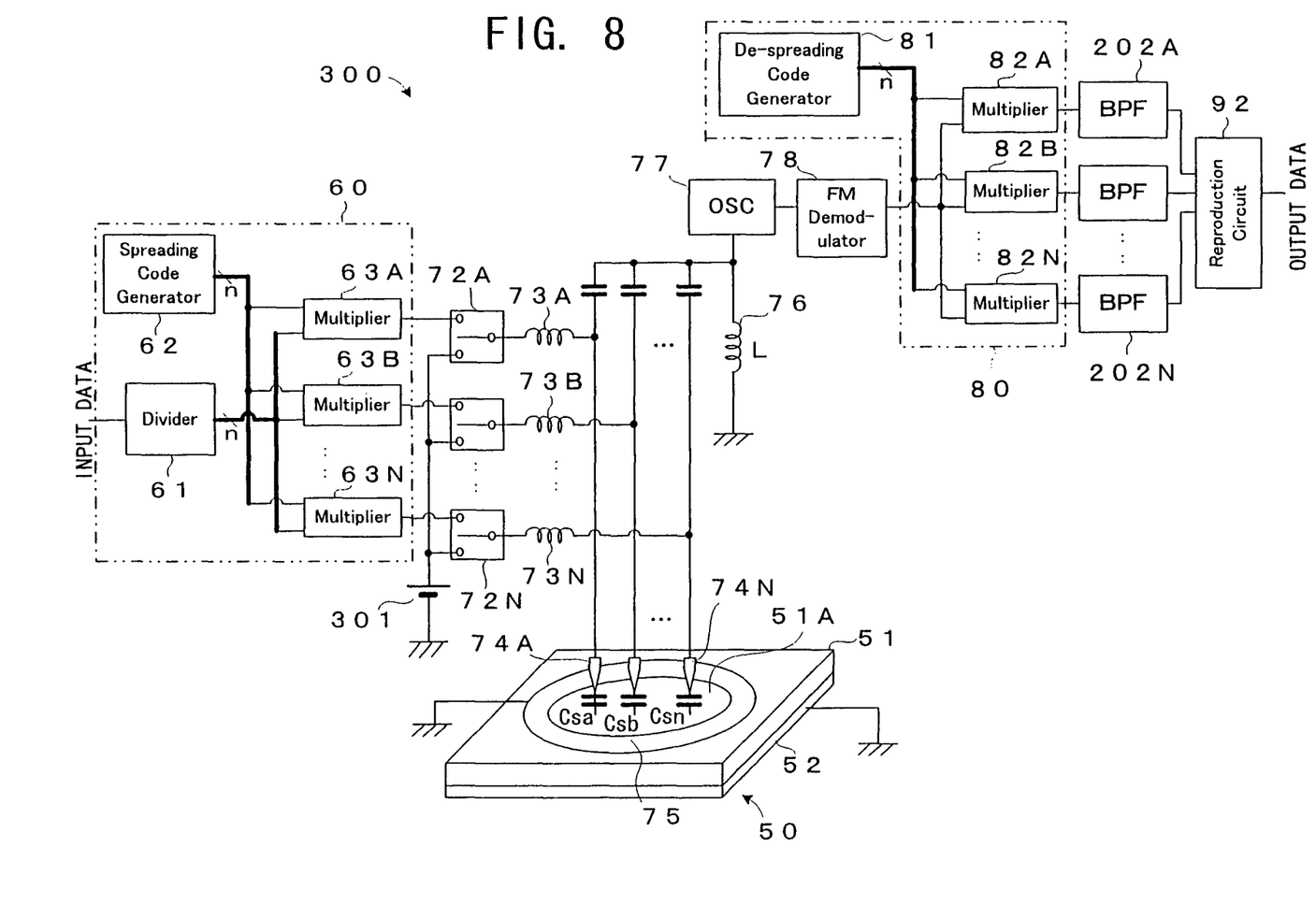
FIG. 8 is a circuit diagram showing a recording/reproducing apparatus in a third example of the present invention.

FIG. 8 shows the structure of a recording/reproducing apparatus 300 in the third example of the present invention. The recording/reproducing apparatus 300 is provided with a direct current bias voltage generator 301 in place of the alternating electric field generator 71 of the recording/reproducing apparatus 200. The direct current bias voltage generator 301 supplies a direct current bias voltage to each of the probes 74A to 74N or the like in order to apply an electric field to the ferroelectric recording medium 50 upon reproducing the spread bit rows recorded on the ferroelectric recording medium 50. Incidentally, the electric field generated on the ferroelectric substance of the recording layer 51 by the direct current bias voltage supplied by the direct current bias voltage generator 301 is smaller than the coercive electric field of the ferroelectric substance.

It is possible to improve the reliability and certainty of the data reproduction even by the recording/reproducing apparatus 300 having such a structure, as with the recording/reproducing apparatus 200. The alternating current signal is used for the data reproduction in the recording/reproducing apparatuses 100 and 200, while the direct current bias voltage is used for the data reproduction in the recording/reproducing apparatus 300. Therefore, the processing speed of the data reproduction is restricted by the frequency of the alternating electric field in the recording/reproducing apparatuses 100 and 200, while there is not such a restriction in the recording/reproducing apparatus 300. In this regard, the recording/reproducing apparatus 300 can relatively easily increase the processing speed of the data reproduction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-167604 filed on Jun. 12, 2003 including the specification, claims, drawings and summary is incorporated herein by reference in its entirety.

What is claimed is:

1. A recording/reproducing apparatus for recording data onto a recording medium and reading the data recorded on the recording medium, comprising:
    a plurality of needle-shaped members;
    a spreading device for generating spread data by performing direct sequence spectrum spreading processing with respect to the data by individually multiplying respective bits of the data by a plurality of spreading codes which are mutually different;
    a recording device for recording the spread data onto the recording medium through said plurality of needle-shaped members;
    a reading device for reading the spread data recorded by said recording device from the recording medium through said plurality of needle-shaped members; and
    a de-spreading device for performing de-spreading processing with respect to the spread data read from the recording medium by using the plurality of spreading codes or a plurality of de-spreading codes respectively corresponding to the plurality of spreading codes.

2. The recording/reproducing apparatus according to claim 1, wherein
    said spreading device generates a plurality of spread bit rows each of which corresponds to the respective bits of the data by individually multiplying the bits of the data by the plurality of spreading codes respectively corresponding to the bits, and
    said recording device distributes and supplies the plurality of spread bit rows to said plurality of needle-shaped members for each spread bit row and records each spread bit row onto the recording medium.

3. The recording/reproducing apparatus according to claim 1, wherein the recording medium is provided with a recording layer constructed from a ferroelectric substance.

4. The recording/reproducing apparatus according to claim 3, wherein said reading device comprises:
    an alternating electric field applying device for applying an alternating electric field to the recording medium;
    a return electrode;
    an oscillating device for generating a frequency modulation signal whose frequency is changed according to capacitance which is included in capacitance between each of said plurality of needle-shaped members and said return electrode and which corresponds to a non-linear dielectric constant of the ferroelectric substance located just under a tip of each of said plurality of needle-shaped members; and
    a converting device for frequency-voltage converting the frequency modulation signal generated by said oscillating device.

5. The recording/reproducing apparatus according to claim 4, wherein said return electrode is disposed on the one surface side of the recording medium as well as said plurality of needle-shaped members.

6. The recording/reproducing apparatus according to claim 4, comprising a bias voltage applying device for applying a direct current bias voltage to the recording medium in place of said alternating electric field applying device.

7. The recording/reproducing apparatus according to claim 3, further comprising a signal processing device for extracting the data from a signal obtained by that said de-spreading device performs de-spreading processing with respect to the spread data read from the recording medium.

8. The recording/reproducing apparatus according to claim 7, wherein said signal processing device includes a Phase Shift Keying (PSK) demodulator.

9. The recording/reproducing apparatus according to claim 7, wherein said signal processing device includes a filter which allows only a predetermined frequency band to be passed.

10. The recording/reproducing apparatus according to claim 1, wherein each of the plurality of spreading codes is a Pseudorandom Noise (PN) code.

11. A recording apparatus for recording data onto a recording medium, comprising:
    a plurality of needle-shaped members;
    a spreading device for generating spread data by performing direct sequence spectrum spreading processing with respect to the data by individually multiplying respective bits of the data by a plurality of spreading codes which are mutually different; and
    a recording device for recording the spread data onto the recording medium through said plurality of needle-shaped members.

12. The recording apparatus according to claim 11, wherein
    said spreading device generates a plurality of spread bit rows each of which corresponds to the respective bits of the data by individually multiplying the bits of the data by the plurality of spreading codes respectively corresponding to the bits, and
    said recording device distributes and supplies the plurality of spread bit rows to said plurality of needle-shaped members for each spread bit row and records each spread bit row onto the recording medium.

13. The recording apparatus according to claim 11, wherein each of the plurality of spreading codes is a Pseudorandom Noise (PN) code.

14. A reproducing apparatus for reproducing data from a recording medium onto which spread data generated by performing direct sequence spectrum spreading processing with respect to the data by individually multiplying respective bits of the data by a plurality of spreading codes which are mutually different is recorded, said reproducing apparatus comprising:
    a plurality of needle-shaped members;
    a reading device for reading the spread data recorded by said recording device from the recording medium through said plurality of needle-shaped members; and
    a de-spreading device for performing de-spreading processing with respect to the spread data read from the recording medium by using the plurality of spreading codes or a plurality of de-spreading codes respectively corresponding to the plurality of spreading codes.

15. The reproducing apparatus according to claim 14, wherein the recording medium is provided with a recording layer constructed from a ferroelectric substance.

16. The reproducing apparatus according to claim 15, wherein said reading device comprises:
    an alternating electric field applying device for applying an alternating electric field to the recording medium;
    a return electrode;
    an oscillating device for generating a frequency modulation signal whose frequency is changed according to capacitance which is included in capacitance between each of said plurality of needle-shaped members and said return electrode and which corresponds to a nonlinear dielectric constant of the ferroelectric substance located just under a tip of each of said plurality of needle-shaped members; and
    a converting device for frequency-voltage converting the frequency modulation signal generated by said oscillating device.

17. The reproducing apparatus according to claim 16, wherein said return electrode and said plurality of needle-shaped members are disposed on a same side with respect to the recording medium.

18. The reproducing apparatus according to claim 16, comprising a bias voltage applying device for applying a direct current bias voltage to the recording medium in place of said alternating electric field applying device.

19. The reproducing apparatus according to claim 15, further comprising a signal processing device for extracting the data from a signal obtained by that said de-spreading device performs de-spreading processing with respect to the spread data read from the recording medium.

20. The reproducing apparatus according to claim 19, wherein said signal processing device includes a Phase Shift Keying (PSK) demodulator.

21. The reproducing apparatus according to claim 19, wherein said signal processing device includes a filter which allows only a predetermined frequency band to be passed.

22. The reproducing apparatus according to claim 14, wherein each of the plurality of spreading codes is a Pseudorandom Noise (PN) code.

* * * * *